Nov. 10, 1942.  S. A. BJERGEL  2,301,850
ARRANGEMENT FOR RELAY GOVERNED VALVES
Filed April 15, 1940   3 Sheets-Sheet 1

Patented Nov. 10, 1942

2,301,850

UNITED STATES PATENT OFFICE 2,301,850

ARRANGEMENT FOR RELAY GOVERNED VALVES

Sven Agne Bjergel, Stockholm, Sweden, assignor to Telefonaktiebolaget L. M. Ericsson, Stockholm, Sweden, a company of Sweden Application April 15, 1940, Serial No. 329,833
In Sweden March 17, 1939

5 Claims. (Cl. 137—139)

The present invention relates to an arrangement for actuating valves or the like which are controlled by servo-motors and relays and an object of the invention is to reduce the relay effort necessary to bring the valve into action.

Arrangements are known in which the armature of the relay or electro-magnet is provided with a spring or the like to restore the armature to its normal position as soon as the current supplied to the electromagnet winding is interrupted. The spring counteracts the armature when the magnet is operated and it is thus obvious that in such an arrangement a relay effort must be used when actuating the device which is considerably greater than the effort necessary to initiate the actuation of the device. According to the present invention a part of the energy delivered by a servo-motor is stored and is then used to release a link system which causes the valve to close when the magnet is de-energized. The energy thus delivered by the servo-motor may thus be stored in a spring or the like.

The invention is described with reference to the accompanying drawings which show a valve controlling arrangement of the above mentioned type, used for example in acoustical alarm systems in which the horns are driven by compressed air.

In order to enable the opening of the valve from a distant place by the aid of a very small force, the valve is provided with a control arrangement having a number of links which are interconnected in such a way that a small force may move the linkage arrangement out of a state of equilibrium, representing the closed position of the valve. The valve is then opened under direct action of a larger force which may be a spring originally loaded by a servo-motor.

Figure 1:
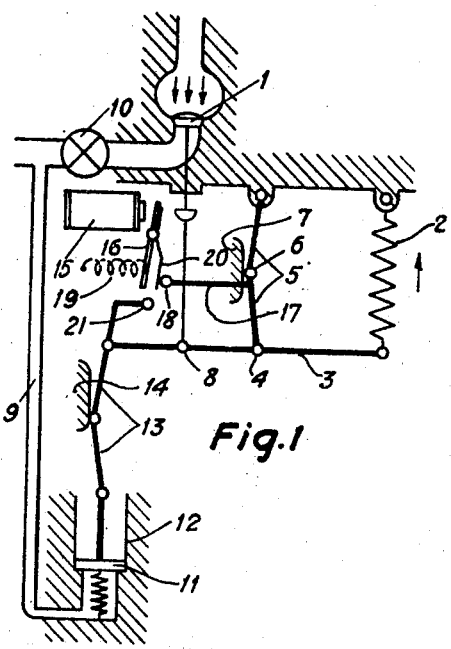
Fig. 1 shows such a valve resting in normal position with the air pipe closed.
Figure 2:
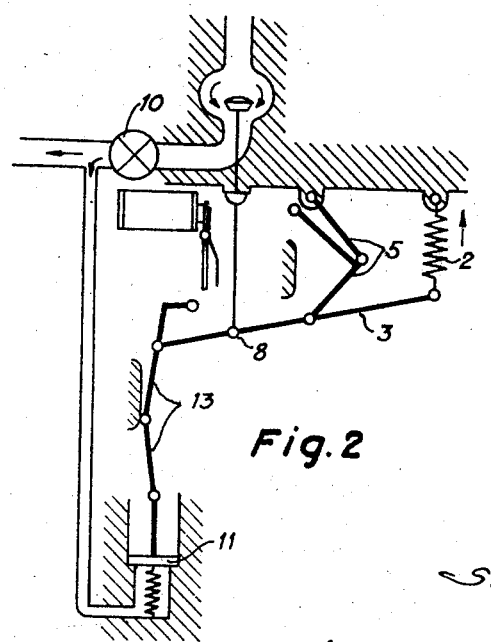
Figs. 2 to 4 illustrate various positions of the valve and actuating linkage shown in Fig. 1.
Figure 3:
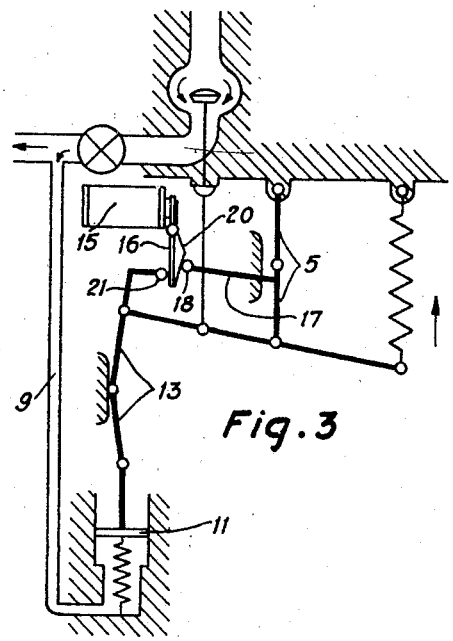
Figure 4:
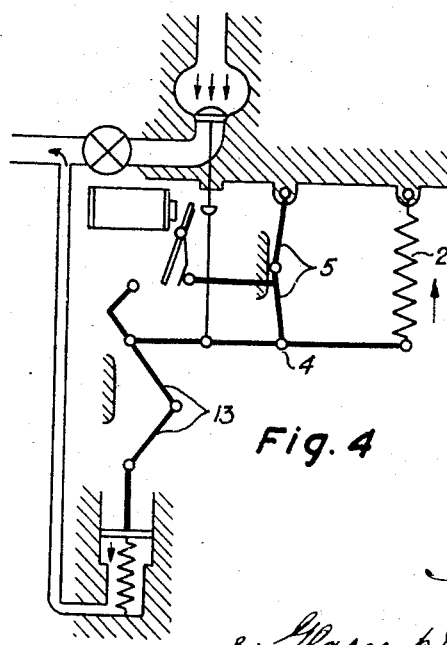

The different positions of the valve controlling arrangement are shown in Figs. 1 to 4 and in Fig. 2 the electromagnet is shown in an energized position with the state of equilibrium of the link system being disturbed and the valve opened by means of a spring controlled by the servo-motor. Fig. 3 illustrates the servo-motor in an actuated position with the link system being operated so as to stretch the spring. The electromagnet is still energized and the valve thus open. In Fig. 4 the electromagnet is de-energized, the link system operated under control of a spring arranged on the armature of the electromagnet and the valve is closed.

In the rest position the valve 1 is pressed against the valve seat by means of a spring (not shown) acting in the direction of the valve spindle. The valve spindle is guided in such a way that the bearing or pivot 8 on the lever 3 cannot be moved sideways.

The servo-motor for closing the valve and for providing energy for later opening of the valve by the aid of a spring 2, is connected to the air pipe by means of a branch pipe 9 connected to the main air pipe on the low pressure side of a reducing valve 10 which keeps the pressure at a level suitable for actuating the valve.

When the valve 1 is closed, the servo-motor piston 11 takes the position in the cylinder 12 shown in Fig. 1. The piston is connected to the lever 3 by a linkage arrangement 13 resting on a stop 14.

A linkage arrangement 5 is arranged in such a manner that a very small lateral force releases the links 5 from a stop 7 with the result that the bearing or pivot 4 of the lever 3 will not be rigidly supported. The spring 2 will now be able to displace the lever 3 thus opening the valve. Under the circumstances the lever 3 turns with the point at which it is attached to one of the links 13 serving as the fulcrum.

The above described action is started by means of an electromagnet provided with a magnet coil 15 and an armature 16 which may engage a rod 17 provided with a roller 18. The rod 17 is carried by one of the links 5 and imparts movement to the linkage arrangement 5 when the valve is to be released.

In known valve controlling arrangements the armatures corresponding to the armature 16 are kept in rest position by a permanent force, represented by a spring 19.

When the valve is to be opened, the armature 16 is moved against the roller 18 causing the linkage arrangement 5 to disengage the stop 7. It is assumed that the spring 20 is not to be a part of this arrangement. This spring is an example of an element of the invention and will be described below. Through the action of the spring 2 the link system will take the position shown in Fig. 2, and the valve 1 is opened. Air may then flow through the main pipe and the air pressure will be reduced by the valve 10 to a pressure suitable for actuating the piston 11 of the servo-motor. The piston 11 will be pressed upwards in the cylinder and will thus act on the lever 3 through the link system 13 causing the lever 3 to turn with the bearing point 8 acting as the fulcrum. When the valve 1 is open this spindle will rest against a stop in the valve housing. The spring 2 will then be stretched under the servo-motor action, and the link system 5 will be moved to a position shown in Fig. 3. The valve controlling device remains in this position as long as the magnet 15 is energized. The valve 1 will thus also remain open and air will flow through the consumer pipe. If the magnet 15 is de-energized, the force, represented by the spring 19 will actuate the armature so as to apply pressure against a roller 21 arranged at one of the links 13 to cause the link system 13 to disengage a stop 14. The lever 3 will therefore lose the support at the connection between the lever and the link system 13. The links 5 in Fig. 3, stretched by the force from the servo-motor, will then take its original position as shown in Fig. 4, and the spring 2 will turn the lever 3 with the pivot 4 serving as a bearing point thus closing the valve 1. The pressure in the consumer pipe 9 will drop, and the links 13, under influence of the magnet armature and the spring 19 will assume the position shown in Fig. 4, and restored to the original position thereof shown in Fig. 1 when the air in the servo-motor flows out of the cylinder.

In the arrangement described, the magnet 15 delivers the energy necessary to disengage the links 13 as well as to overcome the force symbolized by the spring 19, which is used to restore the arrangement to the original position. It is apparent that the magnet will be the more reliable if the force which it has to deliver is small. The invention thus includes an arrangement in which the servo-motor is adapted to deliver the energy required for the initiation of the closing action of the valve.

According to the invention the magnet armature is arranged in such a manner that there are in the resting position no forces acting upon the armature so that the magnet in order to initiate an opening action of the valve delivers only the forces required for this purpose. Thus no energy is stored for initiating the closing action of the valve when the armature is attracted by the magnet. This energy is instead delivered by the servo-motor through the lever 3 and the link system 5 as shown in Fig. 3, as soon as the releasing of the closing action of the valve is initiated. The roller 21 of the link 13 will then be arranged close behind the armature and at the same time the link system 5 is stretched so that pressure is brought to bear upon the storing device or spring 20 until the same is pressed against the armature 16 as shown in Fig. 3. The energy thus stored in the spring 20 is then used to initiate the closing action of the valve. This storing device is thus arranged between the armature and a part, directly or indirectly affected by the servo-motor in such a manner that part of the force delivered by the servo-motor is accumulated in the spring 20. The energy accumulated in this manner is then used to release the closing action, in this case by disengaging the links 13 from the stop 14 when the magnet is de-energized and the armature is released. The described arrangement thus makes it possible to accumulate relatively large quantities of energy without making the work of the magnet to release the opening mechanism of the valve greater than necessary.

The normal position of the controlling arrangement is shown in Fig. 1. The valve is opened by means of a current impulse through the electromagnet 15 causing the links 5 to disengage the stop 7 under action from the armature 16 through the spring 20. Fig. 2 shows the position of different parts of the linkage arrangement during the opening action of the valve 1 as previously described, while Fig. 3 illustrates the different parts at a moment when the servo-motor piston 11 has been moved upwards by the air flowing through the consumer pipe 9. As soon as the servo-motor piston 11 moves the links 5 to the position shown in Fig. 3, the spring 20 of the armature 16 is compressed by the roller 18 on the rod 17. The magnet is still energized, and the armature 16 is thus attracted. The force of the rod 17 on the spring 20 will be transmitted to the armature but will not work upon the releasing roller 21 of the links 13. As soon as the magnet 15 is de-energized, however, the force by which the spring 20 is compressed will act upon the roller 21. The closing mechanism is then released as previously described with reference to Fig. 4.

It has been found to be suitable to adjust the spring 20 so as to act upon the links 5 with a force which is not greater than the force necessary to release the links 13 when closing the valve. As approximately the same force is necessary to release the link system 5 and the link system 13, this force will be sufficient. In this case the gain in magnet effort will be 50% of the effort necessary for driving previously known controlling arrangements.

Figure 5:
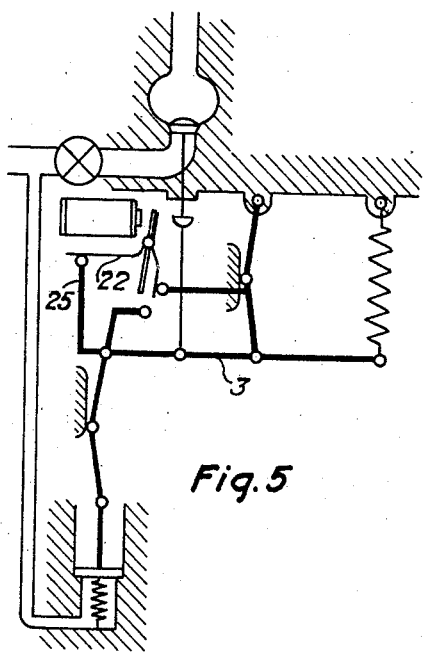
Fig. 5 is a diagrammatic view of modified means for storing energy in the linkage arrangement.

It is not necessary to use the links 5 to convey the force necessary for initiating the closing action. Examples of other constructions are given in Figs. 5 and 6. In Fig. 5 the lever 3 is arranged in such a manner that it may act against a spring 22, fixed to the armature, by means of a lever 25. This arrangement makes it possible to accumulate relatively unlimited energy in the spring which is then used to initiate the closing action of the valve, when the magnet is de-energized.

Figure 6:
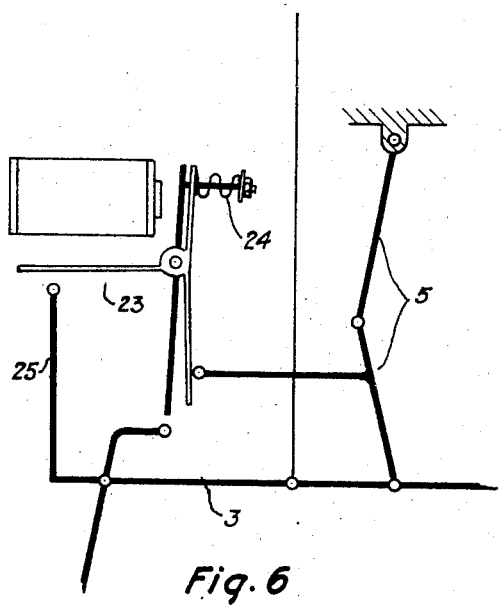
Fig. 6 is a diagrammatic view of a further modification.

Fig. 6 shows another arrangement based on the same principle. In this case the armature is provided with a lever 23 connected to the relay armature by means of a spring 24. When releasing the valve opening mechanism the armature is attracted and conveys a certain force to the lever 23 through the spring 24. In the same manner as previously shown the link system 5 is released. When the servo-motor is started one arm of the lever 23 is pressed upwards by the arm 25 of the lever 3. As the armature is still attracted by the magnet, the spring 24 will be compressed. As soon as the magnet is de-energized the armature is pressed against the releasing mechanism by means of the spring 24 causing the valve to close.

Other arrangements for accumulating the energy, necessary for releasing the closing action of the valve under control of a magnet may of course be devised within the scope of the invention. Such modifications may be made without departing from the spirit and scope of the invention as set forth in the appended claims.

I claim:

1. In a valve controlling arrangement, a valve, a link system cooperating therewith, a servo-motor, a spring, said servo-motor and said spring being interconnected by said link system to actuate the valve, an electromagnet having an armature adapted upon energization to release the link system for actuation of the valve by said spring, means between said armature and said link system for accumulating energy during an operating stroke of said servo-motor for releasing the valve from said actuated position upon de-energization of said electromagnet.

2. In a valve actuating mechanism, a valve movable to an open and to a closed position, a spring, a servo-motor, a linkage assembly connected to the valve and interconnecting the spring and the servo-motor, a relay including an armature adapted upon energization to trip the linkage assembly for actuation by said spring to move the valve to the open position, means for actuating the servo-motor to shift the linkage assembly to tension the spring without closing the valve, and means between said armature and said linkage assembly for accumulating energy after energization of said relay and during actuating of said servo-motor for tripping said linkage assembly whereby the tensioned spring moves the valve to a closed position.

3. In an electromagnetically controlled valve arrangement, a valve including a valve stem, a lever pivoted to the valve stem, a spring biasing one end of the lever, a servo-motor, a collapsible linkage connecting the servo-motor and the other end of the lever, links forming means normally preventing actuation of the valve by said spring, an electromagnet including an armature adapted upon energization to trip said links whereby said lever is pivoted on the collapsible linkage by said spring to move the valve to an open position, means actuating the servo-motor upon opening of the valve to move part of the collapsible linkage adjacent the armature and to swing said lever on the valve stem and tension said spring, and means between said collapsible linkage and said armature for accumulating energy during actuation of the servo-motor for tripping the collapsible linkage when the electromagnet is de-energized.

4. In an electromagnetically controlled valve arrangement, a valve including a valve stem, a lever pivoted to the valve stem, a spring biasing one end of the lever, a servo-motor, a collapsible linkage connecting the servo-motor and the other end of the lever, links forming means normally preventing actuation of the valve by said spring, an electromagnet including an armature adapted upon energization to trip said links whereby said lever is pivoted on the collapsible linkage by said spring to move the valve to an open position, means actuating the servo-motor upon opening of the valve to move part of the collapsible linkage adjacent the armature and to swing said lever on the valve stem and tension said spring, a spring between the collapsible linkage and the armature tensioned during movement of the collapsible linkage for tripping said linkage when the electromagnet is de-energized.

5. A valve control arrangement according to claim 4 wherein said spring is carried by the armature.

SVEN AGNE BJERGEL.